July 4, 1950 — L. E. SIMMONS — 2,513,824
LUBRICATOR
Filed Feb. 15, 1947 — 2 Sheets-Sheet 1

Inventor:
Leon E. Simmons
By Charles F. Osgood,
Attorney.

July 4, 1950  L. E. SIMMONS  2,513,824
LUBRICATOR
Filed Feb. 15, 1947  2 Sheets-Sheet 2
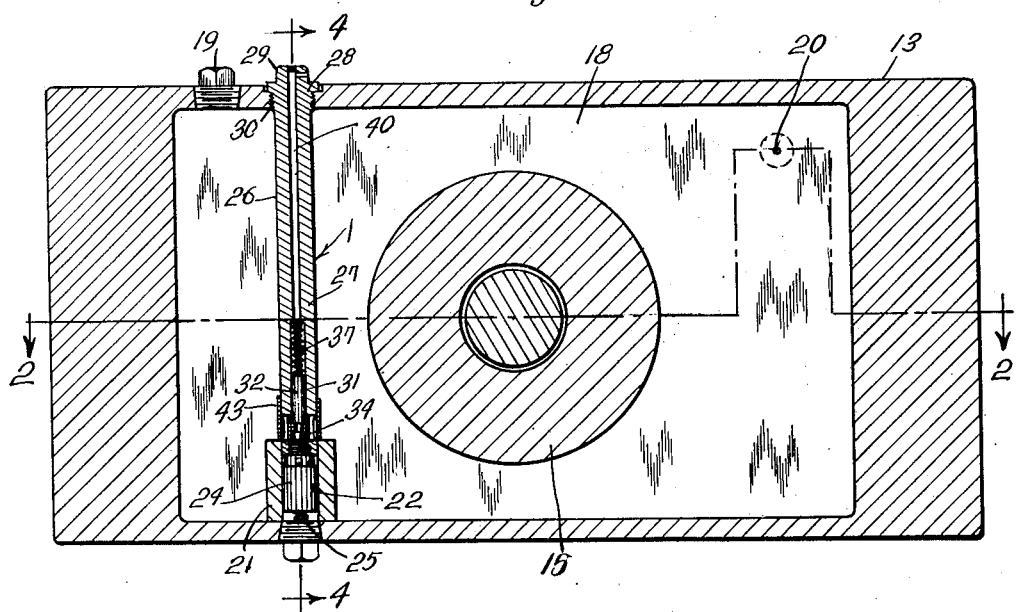
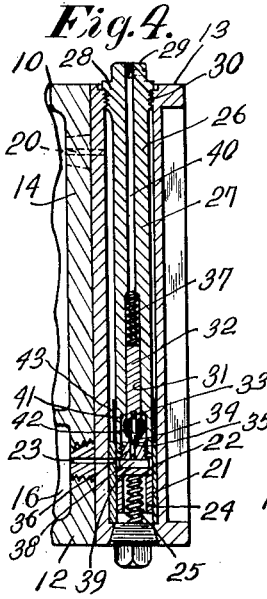
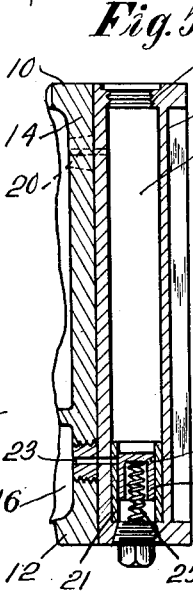
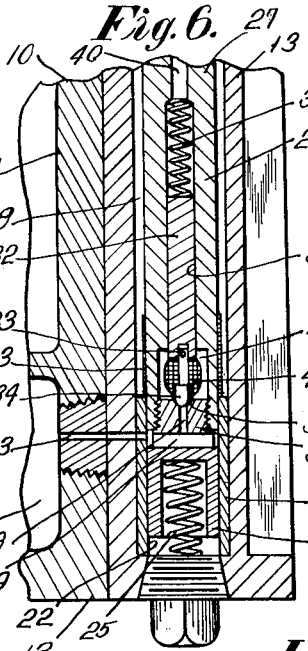
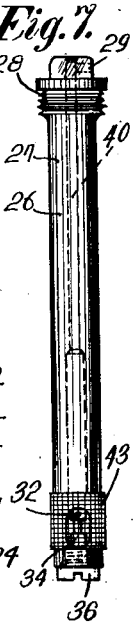
Inventor:
Leon E. Simmons.
by Charles F. Osgood,
Attorney.

Patented July 4, 1950

2,513,824

UNITED STATES PATENT OFFICE 2,513,824

LUBRICATOR

Leon E. Simmons, Claremont, N. H., assignor to Joy Manufacturing Company, a corporation of Pennsylvania Application February 15, 1947, Serial No. 728,783

7 Claims. (Cl. 184—55)

This invention relates to lubricators and more particularly to an improved automatic lubricator for a fluid operated mechanism wherein upon fluid flow to the mechanism, lubricant flow is automatically initiated, and upon interruption of fluid flow to the mechanism, lubricant flow is automatically discontinued.

In fluid operated mechanisms, and particularly in a fluid operated coal cutting machine, it has heretofore been common practice to locate the machine lubricator in the fluid supply line, and such line-lubricators are usually of relatively small capacity, requiring several fillings during a working shift. The present invention, from a broad aspect, contemplates a lubricator for a fluid operated mechanism such as a fluid operated coal cutting machine, wherein the lubricator is embodied in the machine and is provided with a relatively large lubricant reservoir so that lubricant sufficient for at least a working shift is carried by the machine and is automatically supplied, during operation of the machine, to the moving parts to be lubricated. From a more specific aspect, the lubricator may embody a lubricant reservoir formed in the rear head of the motor of the machine, and a fluid inlet chamber is formed in the usual reverse-gear-housing of the motor, and passage means are provided in the motor head and gear housing for supplying pressure fluid to the lubricant reservoir and for discharging lubricant from the reservoir to the fluid inlet chamber so that lubricant is entrained with the fluid flowing through the fluid inlet chamber to the motor and thereby conducted to the moving motor parts. From a more specific aspect, the invention may consist of a self-contained lubricator valve unit of the automatically controlled, pressure-fluid-governed, gravity-feed type which is carried by the motor head and is arranged in the lubricant reservoir; and this valve unit has associated therewith a valve device which is automatically closed when the valve unit is detached from the motor head to prevent undesired flow of lubricant from the lubricant reservoir, and when the valve unit is reinserted in its operative position in the motor head, the valve device is moved into its open position and held there. The lubricator valve unit may be entirely self-contained and preferably of tubelike form so that it may be readily placed in the relatively restricted space provided in the motor head of the machine.

An object of the present invention is to provide an improved lubricator. Another object is to provide an improved lubricator arranged in a novel manner and having associated therewith a lubricant reservoir of relatively large capacity. A further object is to provide an improved automatic lubricator for supplying lubricant to the fluid inlet chamber of a fluid operated motor. A further object is to provide an improved fluid operated lubricator which is automatically rendered active upon fluid flow to the mechanism to be lubricated and which is automatically rendered inactive whenever the flow of pressure fluid to the mechanism is discontinued. A still further object is to provide an improved lubricator valve which may be removed as a unit from its associated mechanism and having cooperating therewith a valve device which is moved automatically to closed position to prevent flow of lubricant from the reservoir upon removal of the lubricator valve unit and which is automatically moved to open position whenever the lubricator valve unit is placed in its operative position. Still another object is to provide an improved automatic lubricator for a fluid operated motor for automatically supplying lubricant to the motor upon running of the latter and for automatically discontinuing lubricant flow whenever the motor is shut down. Yet another object is to provide an improved automatically controlled, pressure - fluid - governed, gravity-feed lubricator which is automatically rendered active upon the supply of pressure fluid thereto and which is automatically rendered inactive when flow of pressure fluid is discontinued. A further object is to provide an improved automatic lubricator for a fluid operated mechanism wherein upon removal of a part of the lubricator, the lubricant discharge passage leading from the lubricant reservoir is automatically closed and wherein when the lubricator part is reinserted in its operative position the lubricant discharge passage is automatically opened. Still another object is to provide an improved lubricator valve and lubricant reservoir arrangement for a fluid operated mechanism. These and other objects and advantages of the invention will, however, hereinafter more fully appear.

In the accompanying drawings there is shown for purposes of illustration one form which the invention may assume in practice.

In these drawings:

Fig. 3 is a cross-sectional view taken substantially on line 3—3 of Fig. 2.

Fig. 4 is a vertical sectional view taken on line 4—4 of Fig. 3.

Fig. 5 is a vertical sectional view similar to Fig. 4, with the lubricator valve unit removed.

Fig. 6 is a fragmentary sectional view taken on the plane of Fig. 3, showing parts on an enlarged scale.

Fig. 7 is an elevational view of the detached lubricator valve unit.

Figure 1:
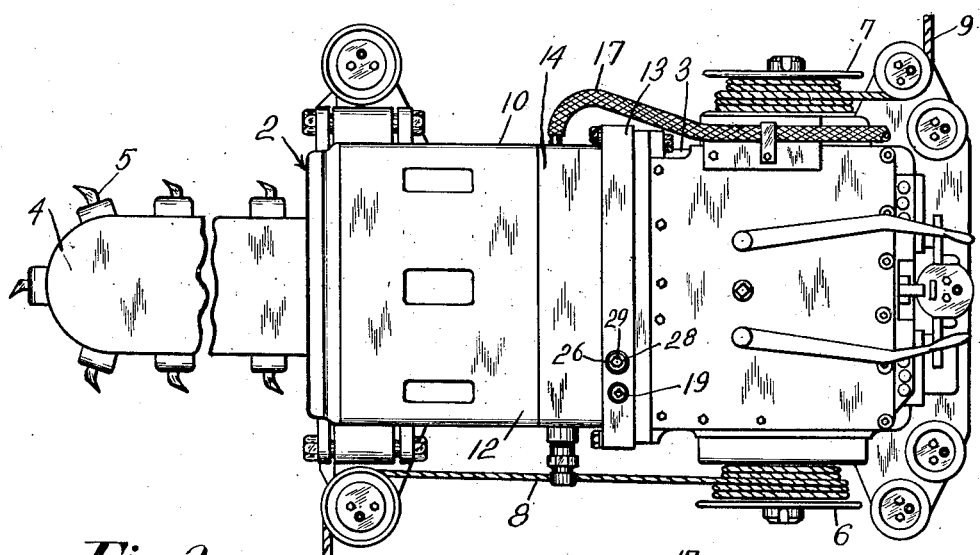
Fig. 1 is a top plan view of a coal cutting machine in which an illustrative form of the improved lubricator is embodied.
Figure 2:
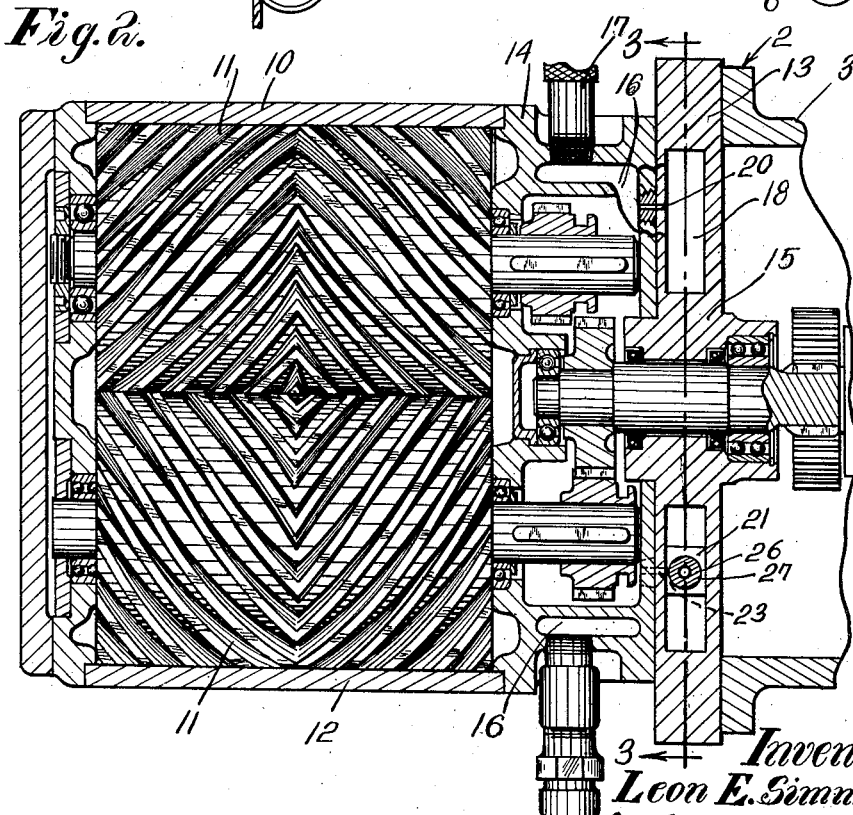
Fig. 2 is a horizontal sectional view taken substantially on line 2—2 of Fig. 3.

In this illustrative embodiment of the invention, the improved lubricator is generally designated 1 and is herein shown embodied in a fluid operated mechanism, for example, a coal cutting machine generally designated 2, for supplying lubricant to certain moving parts of the machine. It will be evident, however, that the improved lubricator may be associated with fluid operated mechanisms of other kinds.

The coal cutting machine 2 is herein of the conventional room and pillar, floor cutter type having a body 3 slidable on its bottom over the floor of a mine, and projecting horizontally lengthwise of the body is an elongated plane cutter bar 4 having an endless cutter chain 5 guided for circulation about its margin. Conventional cable winding drums 6 and 7 are mounted at the sides of the rearward portion of the body and have respectively wound thereon feeding and controlling cables 8 and 9 which have their free ends attachable to suitable anchor jacks and serve to feed and guide the machine bodily over the mine floor both during maneuvering and the cutting operations. Carried by the machine body is a conventional fluid operated motor 10, preferably of the interengaging rotor type, having intermeshing rotor gears 11, 11, and this motor serves to drive the cutter chain and the cable winding drums in a manner well known to those skilled in the art. The motor has a casing 12 formed with suitable parallel overlapping bores for receiving the motor rotors 11 and is provided with a rear head 13 and an intermediate reverse gear housing 14. The motor head has a central bosslike portion 15 for supporting bearings for a transmission shaft driven by the motor. As is usual in motors of this type, the housing 14 has a chamber 16 to which fluid under pressure may be supplied through a hose connection 17, and fluid is supplied from this chamber to the inlet of the motor.

Now referring to the improved lubricator, it will be noted that formed in the rear motor head 13 and surrounding the bosslike portion 15 is a relatively large chamber 18 which is relatively narrow and of relatively great height and length extending substantially the full height and the full width of the motor head (as shown in Fig. 3), thereby providing a lubricant reservoir of relatively large capacity. A usual removable filler plug 19 is provided for replenishing the lubricant supply. A relatively restricted passageway 20 connects the top of the lubricant reservoir with the top of the fluid inlet chamber 16 so that the pressure acting on the surface of the lubricant remains substantially constant during fluid flow to the motor. Arranged at the bottom of the narrow vertical chamber 18 in the rear motor head is a rectangular block 21 suitably fixed in position as by welding between the walls of the head, and this block is formed with a vertical bore 22. A horizontal lubricant discharge passageway 23 formed in the block, head and gear housing connects the bore 22 with the fluid inlet chamber 16 of the motor. Reciprocable vertically in the block-bore is a sleeve valve 24 having a closed upper end and which is constantly urged upwardly toward a position to close the lubricant discharge passageway 23 by a coil spring 25, herein supported at its lower end by a plug threaded within an opening in the bottom of the motor head.

In this improved construction, a self-contained lubricator valve unit 26 is arranged in the head chamber 18 and comprises an elongated tubelike body 27 shaped at its lower end to fit within the block bore 22. The upper end of the tubelike body is in the form of a threaded plug 28 having a square head 29 for turning purposes. This plug is threaded in a bore 30 in the top of the motor head as shown. Slidable in an axial bore 31 in the body 27 is a piston or plunger 32, and this piston has a fluid tight fit in the bore 31 to reduce leakage upwardly past the piston. Attached, as by a lose pin connection, at 33, to the lower end of the piston is a stem of a valve 34, the latter at its lower end being hemispherical in shape and adapted to seat against a conical seat 35 formed on a plug 36 threaded within the lower end of a lubricator body. The loose connection between the piston and the valve stem permits a limited lateral freedom of movement of the valve relative to its seat to insure proper seating. A spring 37 in the bore 31 acts on the upper end of the piston constantly to urge the valve 34 toward its seat. An axial passage 38 in the plug 36 connects the valve seat with a transverse groove 39 in the lower face of the plug, the groove communicating with the block-bore 22 above the sleeve valve 24 when the latter is depressed. The upper end of the bore 31 is vented to atmosphere through a restricted vent passage 40 which opens at its upper end laterally through the upper plug-like portion 28 of the body, as clearly shown in Fig. 3. The lower end of the body above the plug 36 is formed with a chamber 41 which is connected through lateral openings 42 in the body with the head-chamber 18. Tightly surrounding the lower portion of the body and passing over the openings 42 is a cylindric screen 43 for preventing access of dirt to the lubricant discharge passageway 23.

When the lubricator valve unit 26 is in its operative position shown in Figs. 4 and 6, the lower face of the plug 36, secured to the lower end of the lubricator body 27, engages the sleeve valve 24 to move and hold the latter in its depressed position with the lubricant discharge passageway 23 in open communication with the block-bore 22. With the parts so disposed and upon supply of fluid under pressure through the hose connection 17 to the motor inlet chamber 16, fluid flows through the passageway 20 to the chamber 18, wherein it acts upon the surface of the lubricant. The pressure acting on the surface of the lubricant is transmitted through the lubricant to the lower surface of the piston 32, and as the pressures acting on the valve 34 substantially counterbalance each other, the unbalanced fluid pressure on the piston moves the latter upwardly to unseat the valve 34. When this valve is unseated, lubricant may flow by gravity from the reservoir through the screen 43, openings 42, axial passage 38 and transverse groove 39 in the plug 36 and thence through the block-bore 22 and lubricant discharge passageway 23 to the motor inlet chamber 16 wherein the lubricant is entrained with the air flowing to the motor inlet and thereby carried to the moving parts of the motor to lubricate the same. It will be understood that the valve 34 will be maintained open as long as fluid under pressure is supplied to the chamber 18, and when flow of pressure fluid to the chamber 18 is discontinued, the pressure therein drops, thereby causing the spring 37 to move the piston 32 downwardly to bring the valve 34 again against its seat, thereby to cut off lubricant flow. When it is desired to detach the lubricator valve unit from the motor head for any purpose, as for example, for inspection or cleaning of the strainer, the plug 28 may be unthreaded from the opening 30 and the lubricator unit lifted bodily from the motor chamber. When the lubricator valve unit is removed, as shown in Fig. 5, the coil spring 25 automatically moves the sleeve valve 24 into its uppermost position wherein communication of the lubricant discharge passageway 23 with the block-bore 22 is cut off by the valve, thus preventing undesired gravity-flow of lubricant from the lubricant reservoir. When the lubricator valve unit is again inserted into its operative position in the head chamber, the lower face of the plug 36 engages the sleeve valve and forces the sleeve valve downwardly against the action of the spring again to open communication of the lubricant discharge passageway 23 with the block-bore 22.

As a result of this invention, it will be noted that an improved automatic lubricator is provided for a fluid operated mechanism, which is not only extremely compact and simple in design but which also provides a lubricant reservoir of relatively large capacity. It will further be evident that an improved fluid operated lubricator is provided which is automatically rendered active upon fluid flow to the mechanism to be lubricated and which is automatically rendered inactive whenever the flow of pressure fluid to the mechanism is discontinued. It will also be evident that by the provision of the self-contained lubricator valve unit and the associated valve device, the lubricant discharge passageway is automatically closed by the valve device upon removal of the lubricator valve unit; and the valve device is automatically moved into a position to open the lubricant discharge passageway whenever the lubricator valve unit is placed in its operative position. Further, by the provision of the improved lubricator arrangement, it is possible to locate the lubricator in the relatively restricted space provided in a conventional coal cutting machine while at the same time providing a lubricant reservoir of relatively large capacity designed to operate without refilling at least during a working shift. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a pressure fluid chamber, a lubricant reservoir, a passage for establishing restricted communication between said chamber and said reservoir for subjecting the lubricant to a substantially constant pressure during fluid flow through said chamber, a discharge passage for conducting lubricant from said reservoir to said chamber, a valve device for opening and closing said discharge passage, and an automatic control valve unit governed by the pressure acting on the lubricant in said reservoir for controlling fluid flow through said discharge passage, said control valve unit being operative when placed in operative relation with said passages and said reservoir to move said valve device into its open position, and means for moving said valve device automatically into a position to close said discharge passage when said automatic valve unit is removed from said reservoir.

2. In combination, a casing, a lubricant reservoir formed in said casing, a fluid chamber, a passage for establishing restricted communication between said chamber and said reservoir for subjecting the lubricant to a substantially constant pressure during fluid flow through said chamber, a discharge passage for conducting lubricant from said reservoir to said chamber, a fluid-pressure-governed, gravity-feed lubricant control valve device attached to said casing and positioned in said reservoir for controlling lubricant flow through said discharge passage, a control valve engaged by a part of said control valve device when the latter is inserted in operative position on said casing within said reservoir, said control valve being held in open position by said part of said control valve device and movable automatically into a position to close said discharge passage when said control valve device is detached from said casing, and means for moving said control valve into said latter position.

3. In a lubricator, a casing providing a lubricant reservoir to which pressure fluid is adapted to be supplied, a passage for conducting lubricant from said reservoir to a part to be lubricated, a control valve constantly urged toward a position to close said passage, and an automatic control valve unit positionable in said casing and governed by the reservoir pressure, said valve unit arranged within said reservoir for regulating lubricant flow through said passage, said valve unit upon bodily insertion thereof into its operative controlling position acting on said control valve to move the latter into its open position.

4. In a lubricator, a casing providing a lubricant reservoir to which pressure fluid is adapted to be supplied and having a discharge passageway, an automatic control valve unit attachable to said casing and governed by the pressure in said reservoir for regulating lubricant flow through said passageway, a control valve normally held open by said valve unit and movable automatically to a position to close said passageway when said valve unit is bodily detached from said valve casing, and means for moving said valve into such position.

5. In a lubricator, a lubricant reservoir to which fluid under pressure is adapted to be supplied and having a discharge passageway, a valve for normally closing said passageway, and a lubricant control valve device governed by the reservoir pressure and having a part engageable with said valve for moving the latter into and for holding the same in its open position when said control valve device is bodily placed in its operative controlling position within said reservoir.

6. In a lubricator, a casing having a chamber providing a lubricant reservoir to which pressure fluid is adapted to be supplied, said casing having a wall formed with an opening and a parallel wall formed with a bore, a lubricant discharge passage communicating with said bore, and a self-contained closure plug and lubricant control valve unit insertible through said opening within said reservoir and provided with a closure plug portion for closing said opening with the inner end of said unit received in said bore and including an automatic fluid actuated control valve governed by the reservoir pressure for controlling the flow of lubricant from said reservoir to said discharge passage.

7. In a lubricator, a casing having a chamber providing a lubricant reservoir to which fluid under pressure is adapted to be supplied, said casing having a wall formed with an opening and a parallel wall formed with a bore, a lubricant discharge passage communicating with said bore, a self-contained lubricant control valve unit insertible through said opening within said reservoir with its inner end received in said bore and including an automatic fluid actuated control valve governed by the pressure in said reservoir for controlling the flow of lubricant from said reservoir to said discharge passage, a normally open valve reciprocable in said bore and held in open position by said control valve unit when the latter is in its operative controlling position, said valve being movable automatically to a position to close said discharge passage when said control valve unit is detached from said casing, and means for moving said valve into said latter position.

LEON E. SIMMONS.

REFERENCES CITED

The following references are of record in the file of this patent:

UNITED STATES PATENTS

| Number | Name | Date |
| --- | --- | --- |
| 906,733 | McEvoy | Dec. 15, 1908 |
| 1,205,485 | Schumacher | Nov. 21, 1916 |
| 1,401,081 | Howard | Dec. 20, 1921 |
| 1,638,032 | Himmelsbach | Aug. 9, 1927 |
| 1,721,231 | Osborne | July 16, 1929 |
| 1,956,644 | Hamerly | May 1, 1934 |
| 2,111,583 | DeMooy | Mar. 22, 1938 |

Certificate of Correction

July 4, 1950

Patent No. 2,513,824

LEON E. SIMMONS

It is hereby certified that error appears in the printed specification of the above numbered patent requiring correction as follows:

Column 4, line 17, for "lose" read *loose*; column 8, list of references cited, add the following:

| 2,209,856 | Smith | July 30, 1940 |
| 2,352,826 | Finch | July 4, 1944 | and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*